April 19, 1938. S. H. ANDERSON 2,114,283
CATHODE RAY PITCH AND BANK INDICATOR FOR AIRCRAFT
Filed Sept. 23, 1933 2 Sheets-Sheet 1
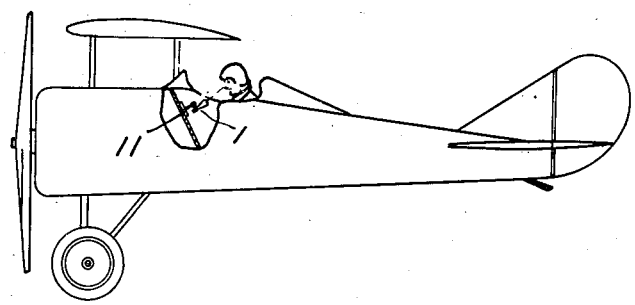
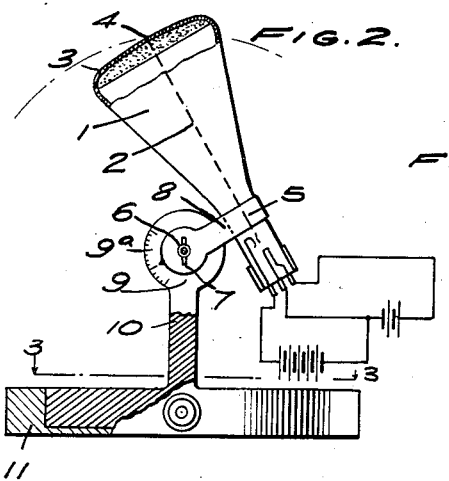
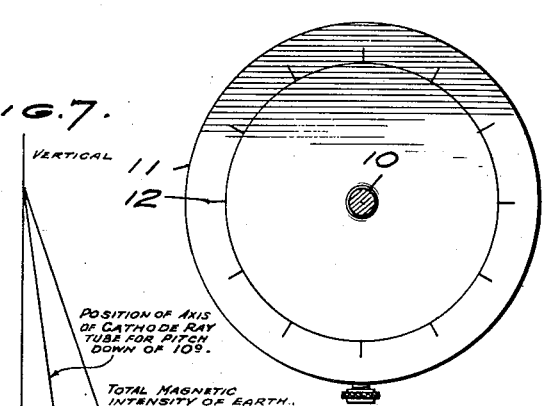
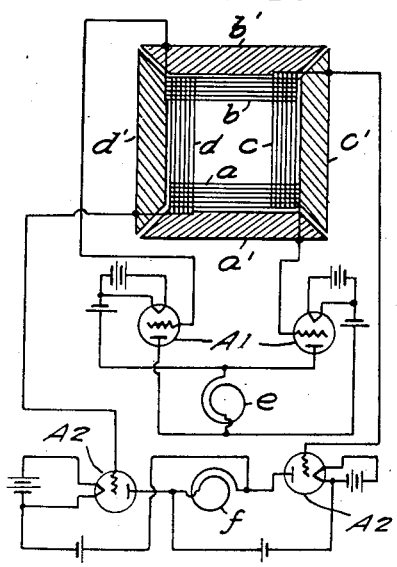
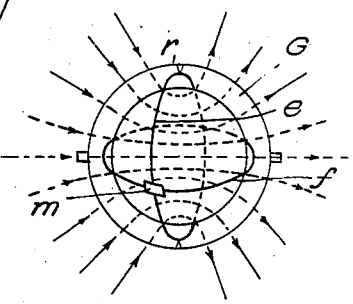
INVENTOR
SAMUEL H. ANDERSON
BY *Francis H. Vandermarker*
*Clade Knutz*
ATTORNEYS April 19, 1938.   S. H. ANDERSON   2,114,283
CATHODE RAY PITCH AND BANK INDICATOR FOR AIRCRAFT
Filed Sept. 23, 1933   2 Sheets-Sheet 2
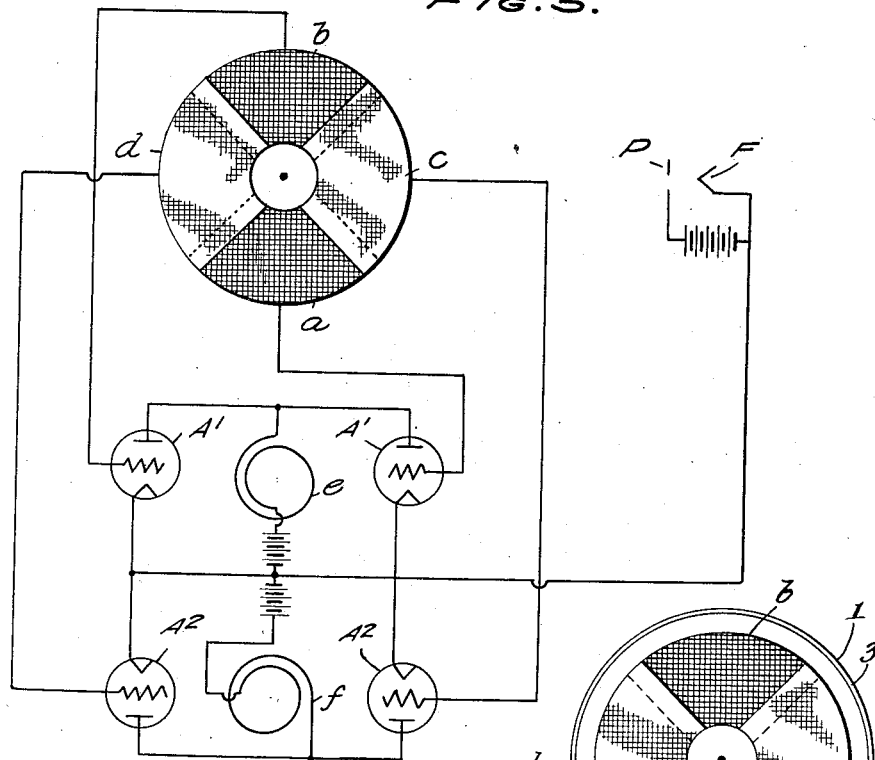
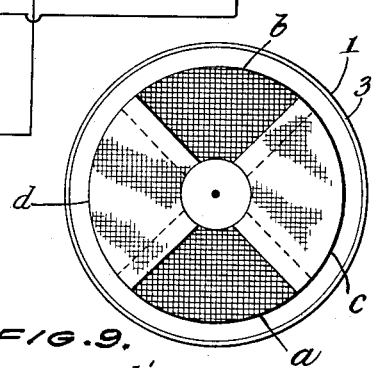
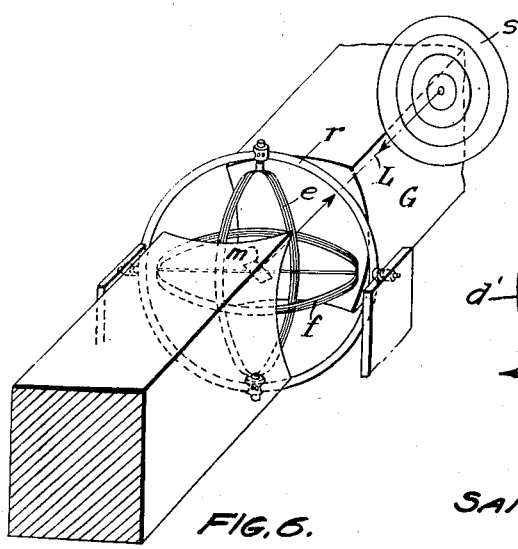
INVENTOR
SAMUEL H. ANDERSON
BY Francis H. Vanderwaker
and Wade Kountz
ATTORNEYS Patented Apr. 19, 1938

2,114,283

UNITED STATES PATENT OFFICE 2,114,283

CATHODE RAY PITCH AND BANK INDICATOR FOR AIRCRAFT

Samuel H. Anderson, Fort Monmouth, Oceanport, N. J.

Application September 23, 1933, Serial No. 690,753

12 Claims. (Cl. 33—204)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to deviation indicators for dirigible craft and proposes a device of this class which will show deviations of aircraft from a normal flight level or balance with special reference to such movements as pitch, turn and bank.

More specifically the invention may be designated as a cathode ray pitch and bank indicator for aircraft. An important object of the invention is to provide means which will give a direct indication of bank or pitch; to the right for a right bank, to the left for a left bank, down for a down-pitch and up for an up-pitch.

Broadly, the invention employs the effect of a magnetic field upon a pencil or beam of moving electrons, such for example as the cathode ray beam of a cathode ray tube. In the simplest form, the invention makes use of the effect of the earth's magnetic field, or a component of the earth's magnetic field, upon the electronic beam or ray of a cathode ray tube. In another form or embodiment of the invention, a locally generated magnetic field is employed, coordinated with circuit means and a meter mechanism which will permit the location of most of the equipment remotely from the instrument board, that is to say in the tail of an airplane, for example, in which case a simple indicating instrument would be mounted upon the instrument board.

To these and other ends, the invention consists in the features of construction, mode of operation and arrangement of parts hereinafter more fully described, and illustrated in the accompanying drawings, in which:

Fig. 1 shows an embodiment where the cathode ray tube is mounted in an airplane in a convenient position for inspection by the pilot of the window of the tube;

Fig. 2 is a view partly in section of a simple form or embodiment of the invention in which deflections of the cathode ray pencil or beam of a cathode ray tube give direct indication through the window of the tube of deviations of the craft, certain circuit connections being shown diagrammatically.

Fig. 3 is a detail plan view taken on line 3—3 of Fig. 2 showing the scale for reading azimuth;

Fig. 4 shows a modified form of the invention, the circuit system being shown diagrammatically;

Fig. 5 shows another modification;

Fig. 6 shows the essential elements of a meter mechanism such as a galvanometer for use in connection with the forms depicted in Fig. 4 and Fig. 5.

Fig. 7 is a diagram to show graphically how, when the tube responds to deviations of the craft, the cathode ray beam is deflected under influence of components of the earth's magnetic field; and Figs. 8 and 9 show the electrodes of Fig. 4 and Fig. 5, respectively, mounted at the window end of the cathode ray tube.

Referring to Fig. 2, the numeral 1 generally designates a suitable form of cathode ray tube having means well known in the art for producing an electronic pencil or cathode ray beam 2. The end wall or window 3 is provided with a fluorescent screen or equivalent means for visualizing the impinging cathode ray or beam. The point where the said ray illuminates the screen at moments of rest is marked by a spot of light as at 4. In accordance with well known practice, a conventional circuit system comprises a current source for operating the tube, including a source of potential for heating the filament or cathode, and a higher voltage operative with the anode and other elements for accelerating the flow of electrons constituting the cathode ray toward the anode so as to accentuate the luminosity of the light spot on the screen. Means is provided for adjustably mounting the tube on some fixed part of the craft, comprising a collar 5 embracing the neck of the tube, and pivoted as at 6, being provided with means such as a wing nut and bolt 7, for clamping the collar and bracket connection 8 in adjusted positions. Annular member 9 has a scale for reading elevation as at 9a, whereby the angle of inclination of the tube axis may be determined. The pedestal or column 10 is secured to member 9 and a support, said support comprising an outer annular base member 11 and an inner annular member integral with the column 10 and provided with a scale as at 12 for reading azimuth. The adjustments permit the tube to be properly oriented both in altitude and azimuth. The outer base member is adapted for attaching the entire assembly to some fixed part of the craft. Thus, when adjustments have been made to properly position the tube so that the cathode ray or beam is correctly oriented relative to the magnetic field such as the earth's magnetic field, or a component thereof, deviations of the craft will be determined by deflections of the cathode beam and will be indicated by the spot of light appearing on the fluorescent screen. Obviously, the end wall or window 3 of the tube may be marked with suitable graduations to facilitate reading of movements of the spot of light in terms of pitch and bank deviations of the craft.

In operation, the apparatus of Fig. 2 is mounted in such a position on the craft that the pilot or operator may conveniently inspect the window of the tube at all times. Adjustments are made so that when the craft is flying level and on a specified course, the longitudinal axis of the tube is parallel with the total magnetic intensity of the earth's field. Under these conditions the spot of light as at 4 remains stationary in the center of the screen. If the ship pitches down or noses up, or banks to the left or right, a component of the earth's magnetic field is at right angles to the axis of the tube and causes the cathode ray to be deflected away from the center. (See Fig. 6.) When the ship is brought back to normal flying level on the course, the indicating spot returns to the center of the screen. In this simple form of apparatus, a pitch of the craft down causes a deflection of the cathode ray to the right; a pitch up causes deflection of said ray to the left; banking of the craft to the right (without turning) causes deflection of the cathode ray beam to the rear; a bank to the left (without turning) causes a deflection forward.

An alternative form or modification is illustrated in Fig. 4. In place of the fluorescent screen a special electrode is provided, being here shown as comprising four grids $a$, $b$, $c$ and $d$, preferably of fine gage wire, each of said grids having an associated trapezoidal metal plate designated, respectively, as $a'$, $b'$, $c'$ and $d'$. The wires of each grid are parallel to each other and spaced equally so that the space between each pair is equal to the diameter of the wire. All the wires of each grid are connected electrically to each other, and to the respective trapezoidal plate adjacent to the grid. Grids $a$ and $b$ are connected through an electron tube amplifying circuit, generally designated by the character $A1$ to one coil $e$ of a special galvanometer G (see Fig. 6); and grids $c$ and $d$ are connected, through another amplifying circuit $A2$, to the second coil $f$ of the galvanometer G. The electric circuits are so connected that if the cathode ray beam is deflected to the rear and falls on grid $a$, the galvanometer coil $e$ turns to the right; if the cathode ray beam falls on grid $b$, the coil $e$ turns to the left; if the cathode ray beam falls on grid $c$, the coil $f$ turns down; if the cathode ray beam falls on grid $d$, the coil $f$ turns up. If the cathode ray beam moves diagonally so as to fall on two grids at the same time, that is to say on the overlapping electro-magnetic areas formed where adjacent pairs of grids occupy superimposed intersecting positions relative to each other, both galvanometer coils $e$ and $f$ are actuated indicating both pitch and bank.

Another form or modification is illustrated in Fig. 5. In place of the fluorescent screen a special electrode is provided, being here shown as comprising four grids $a$, $b$, $c$ and $d$. Each grid is shaped essentially as the quadrant of a circular plane and is made of fine mesh wire screen such as used in the construction of grids of standard vacuum tubes. Grids $a$ and $b$ are mounted in the same plane and grids $c$ and $d$ are mounted in a plane below that of $a$ and $b$. Each grid is insulated electrically from each of the other grids. Each grid is of such size and is so mounted that the areas of $a$ and $b$ projected on the end wall of the cathode-ray tube overlap the projected areas of $c$ and $d$. Grids $a$ and $b$ are connected through an electron tube amplifying circuit, generally designated by the character $A1$, to one coil $e$ of a special galvanometer G (see Fig. 6); grids $c$ and $d$, are connected through another amplifying circuit $A2$, to the second coil $f$ of the galvanometer G. In Fig. 5, P and F indicate, respectively, the plate and filament of the cathode-ray tube.

Referring to Fig. 6, a suitable form of indicating galvanometer is there shown in perspective. The two coils $e$ and $f$ are rigidly connected, so that their planes are mutually perpendicular one to the other, $e$ being vertical and $f$ horizontal. Coil $e$ is pivotally mounted on gimbal ring $r$ so as to turn about a vertical axis. Gimbal ring $r$ is pivotally mounted on the frame of the galvanometer. Both coils are in a strong, permanent magnetic field that is uniform radially from the common center of the two coils. A small mirror $m$ is fastened at the common center of the two coils and is so mounted that the face of the mirror is at an angle of 45° to the axes of coil $e$ and coil $f$ respectively and also at an angle of 45° to the planes of coil $e$ and coil $f$ respectively. A screen S is fixed by a suitable mounting so that it is parallel to mirror $m$ when the coils $e$ and $f$ are at zero position. From a small projector behind screen S a pencil of light L is directed through a small hole in the center of S on to mirror $m$. For zero position of coils $e$ and $f$, this pencil of light will be reflected back upon itself, and for an angular displacement of either or both of the coils, the reflected pencil will strike screen S at a plane corresponding to the angular displacement of the coil system. The screen S can be appropriately marked to indicate, "Pitch Up", "Pitch Down"; "Bank Right", "Bank Left", respectively.

As will be apparent, the embodiments here shown by way of example are capable of considerable change and rearrangement without departing from the spirit of the invention. It is to be understood, therefore, that modifications and equivalent arrangements are contemplated within the scope of the invention, as defined by the appended claims:

I claim:—

1. An indicator for aircraft, comprising a cathode ray tube secured to the craft; circuit means comprising elements responsive to movements of the cathode ray of said tube; means to orient the longitudinal axis of said tube to establish zero deflection of the ray in relation to the earth's magnetic field during normal flight level of the craft; and means comprising a meter mechanism electrically operative with said elements to indicate deviations of the craft in accordance with deflections of the cathode ray relative to said longitudinal axis.

2. An indicator for aircraft, comprising a cathode ray tube carried by the craft; means including circuit elements responsive to deflections of the cathode ray of said tube; means for adjusting the tube to orient its longitudinal axis to fix the cathode ray at zero deflection in relation to the earth's magnetic field during normal flight level of said craft; and means comprising a meter mechanism electrically controlled by said elements to indicate pitch and bank deviations of the cathode ray relative to said longitudinal axis.

3. An indicator for aircraft, comprising a cathode ray tube secured to the craft; circuit means comprising a source of electrical energy and including an electrode system responsive to deflections of the cathode ray in at least two directions of its movement; means to orient the longitudinal axis of the tube to establish zero deflection position of the ray in relation to the earth's magnetic field during normal flight level of the craft; and means comprising a meter mechanism electrically operative with said electrode system to indicate deviations of the craft in accordance with deflections of the ray relative to said longitudinal axis.

4. An indicator for aircraft, comprising a cathode ray tube; means for securing the tube to the craft, including means to orient the longitudinal axis of said tube in elevation and azimuth in parallelism to the earth's magnetic field and to secure zero deflection of the cathode ray during normal flight level of the craft; a circuit system comprising a source of electrical energy, and including a system of electrodes mounted at the window end of said tube responsive to deflections of the cathode ray of the tube; and means comprising a meter mechanism electrically coordinated with said system for indicating deviations of the craft in accordance with deflections of the cathode ray across said electrodes.

5. An indicator for aircraft, comprising a cathode ray tube; means for securing the tube to the craft, including means to orient the longitudinal axis of said tube in elevation and azimuth relative to the earth's magnetic field and to secure zero deflection of the cathode ray relative to said axis during normal flight level of the craft; a circuit system comprising a source of electrical energy responsive to deflections of the cathode ray and including foraminate grids, said grids being mounted in superimposed relation at the window end of the tube to define overlapping areas; and means comprising a meter mechanism operative with said system to indicate deviations of the craft, said meter mechanism indicating a deviation in one direction when the ray is deflected across one grid at a time, and a deviation in two directions when the ray is deflected across any one of said areas.

6. An indicator for aircraft, comprising a cathode ray tube secured to the craft; circuit means comprising a source of electrical energy and including inductance elements responsive to deflections of the cathode ray of said tube, said elements being arranged in the form of flat foraminate grids at right angles relative to one another and having overlapping areas; means for adjusting the tube to orient its longitudinal axis in relation to the earth's magnetic field and to secure zero deflection of the cathode ray relative to said axis during normal flight level of said craft; and means comprising a meter mechanism operative with said elements to indicate deviations of the craft, said meter mechanism indicating a deviation in one direction when the ray is deflected across one grid at a time, and a deviation in two directions when the ray is deflected across any one of said areas.

7. An indicator for aircraft, comprising a cathode ray tube; means for securing the tube to the craft, including means to orient the longitudinal axis of said tube in elevation and azimuth in relation to the earth's magnetic field and to secure zero deflection of the cathode ray during normal flight level of the craft; a circuit system comprising a source of electrical energy, and including an electrode system mounted at the window end of the tube formed of a plurality of foraminate grids arranged in superimposed relation to define overlapping areas, said grids being responsive to deflections of the cathode ray of said tube; an electronic amplifier for said system; and means comprising a meter mechanism operative with said system and fed from the amplifier for indicating pitch and bank deviations of the craft in accordance with deflected movements of the cathode ray relative to said grids.

8. An indicator for aicraft, comprising a cathode ray tube; means for securing the tube to the craft, including means to orient the longitudinal axis of said tube in elevation and azimuth in relation to the earth's magnetic field and to secure zero deflection of the cathode ray during normal flight level of the craft; a circuit system comprising a source of electrical energy and including a four element electrode mounted at the window end of the tube and responsive to deflections of the cathode ray of said tube, said elements being formed of screen material arranged in superimposed relation to define overlapping areas; an electronic amplifier for said system; and means operative with the system comprising a meter mechanism fed from the amplifier for indicating deviations of the craft, a deflection of the ray across one element indicating a pitch movement, a deflection across a different element indicating a bank movement, and deflection across any one of said areas indicating pitch and bank movements.

9. An indicator for aircraft, comprising a cathode ray tube; means for securing the tube to the craft, including means to orient the longitudinal axis of said tube in elevation and azimuth in relation to the earth's magnetic field, and to secure zero deflection of the cathode ray during normal flight level of the craft; a circuit system comprising a source of electrical energy and including a system of electrodes mounted at the window end of the cathode tube, said electrodes being formed of screen material and divided into quadrants responsive to deflections of the cathode ray and positioned in superimposed relation to define overlapping areas of predetermined extent; an electronic amplifier for amplifying the output of said system; and means comprising a meter mechanism operative with said system and fed from the amplifier to indicate deviations of the craft, a deflection of the cathode ray across any one quadrant indicating a pitch movement, a deflection across a different quadrant indicating a bank movement, and deflection across any one of said areas indicating pitch and bank movements.

10. An indicator for aircraft, comprising a cathode ray tube; means for securing the tube to the craft, including means to orient the longitudinal axis of said tube in elevation and azimuth in relation to the earth's magnetic field, and to secure zero deflection of the cathode ray during normal flight level of the craft; a circuit system comprising a source of electrical energy and including an assembly of electrodes mounted at the window end of the tube, said electrodes being formed of screen material and divided into sections individually responsive to deflections of the cathode ray and superimposed to define overlapping areas of predetermined extent; an electronic amplifier for said circuit system; and means comprising a meter mechanism operative with said system and fed through the amplifier to indicate deviations of the craft in accordance with deflections of the cathode ray relative to the longitudinal axis of the tube, a deflection across one of said sections indicating a pitch movement, a deflection across another one of said sections indicating a bank movement, and a deflection across one of said areas indicating pitch and bank movements.

11. An indicator for aircraft, comprising a cathode ray tube secured to the craft, the longitudinal axis of said tube being oriented to fix the cathode ray at zero deflection in relation to the earth's magnetic field during normal flight level of the craft; means including circuit elements responsive to deflections of said cathode ray; and means comprising a meter mechanism electrically controlled by said elements to indicate deviations of the craft in accordance with deflections of said ray relative to said longitudinal axis.

12. An indicator for aircraft, comprising a cathode ray tube secured to the craft, said tube having its longitudinal axis oriented with relation to the earth's magnetic field to secure zero deflection of the cathode ray during normal flight level of the craft; means comprising a system of electrodes connected in circuit relation and responsive to deflections of said cathode ray; and a meter mechanism electrically controlled by said electrodes to indicate deviations of the craft in accordance with deflections of said ray relative to said longitudinal axis.

SAMUEL H. ANDERSON.